UNITED STATES PATENT OFFICE 2,588,867

PYROLYTIC PRODUCTION OF CHLOROHYDROCARBONS

Elton K. Morris, Midland, Mich., assignor to The Dow Chemical Company, Midland, Mich., a corporation of Delaware No Drawing. Application October 25, 1948, Serial No. 56,473

6 Claims. (Cl. 260—654)

This invention relates to an improved vapor-phase pyrolytic process for making chlorohydrocarbons.

It is well known that chlorohydrocarbons can be produced by pyrolyzing polychloroalkanes in the presence of chlorine. When the latter is present in small proportion, the predominant reaction is dehydrochlorination to form chloro-olefins, the chlorine functioning mainly as a catalyst. When the chlorine is present in high proportion, chlorination and dehydrochlorination both occur, with the resultant formation of complex mixtures of chloro-olefins and polychloroalkanes. By appropriately choosing the polychloroalkane starting material, the proportion of chlorine, and the temperature, any of a number of commercially valuable chlorohydrocarbons can be made as the preponderant reaction product. In all these processes, however, pyrolysis rates are such that a significant part of the chlorine may escape reaction and appear in the vent gas, from which it cannot economically be recovered.

It has now been found that bromine vapor accelerates the high-temperature vapor-phase interaction of polychloroalkanes and chlorine so significantly that little if any chlorine escapes reaction. Vent losses can accordingly be reduced to a very low value. The accelerating action of the bromine also produces considerably higher conversions to chloro-olefins than are realized when bromine is absent.

The polychloroalkanes with which the discovery of the invention has been found applicable are those containing two to three carbon atoms and not over four chlorine atoms per molecule, e. g. ethylene dichloride, propylene dichloride, the trichloroethanes, the tetrachloroethanes, the trichloropropanes, etc. The proportion of the chlorine reactant used may range from a small but catalytic amount up to equimolecular or higher proportions depending on the product desired, with values of 5 to 100 mol per cent of the polychlorohydrocarbon being most common. Preferred reaction temperatures are in general from about 300° to about 650° C., the lower limit in any particular case being that below which the reaction rate is too slow to be practical and the upper limit being that at which carbonization begins. Temperatures of 350° to 625° C. are ordinarily most satisfactory.

The accelerating agent according to the invention may be added either in the form of bromine itself or as a compound yielding bromine at elevated temperature, i. e. under reaction conditions. Examples of such bromine yielding compounds are phosphorus tribromide, hydrogen bromide, and bromohydrocarbons such as methylene dibromide, bromoform, carbon tetrabromide, ethyl bromide, ethylene dibromide, tribromoethylene, tribromoethane, acetylene tetrabromide, pentabromoethane, isopropyl bromide, sec. butyl bromide and iso-amyl bromide. The bromine or bromine-yielding substance need be present only in catalytic proportion, 0.1 to 5 mol per cent of the polychloroalkane usually being adequate.

In the high-temperature interaction of polychloroalkanes and chlorine, bromine and the more highly brominated compounds, e. g. bromoaliphatic hydrocarbons containing less than 3 carbon atoms and more than 2 bromine atoms per molecule, appear to catalyze both the chlorination and dehydrochlorination reactions in like degree. With these accelerators, the reaction product is accordingly rich in chloro-olefins. On the other hand, with less highly brominated hydrocarbon accelerators, especially with bromoalkanes containing from one to two bromine atoms and three to five carbon atoms per molecule, the catalysis of the dehydrochlorination, though still marked, is less drastic, so that the reaction product is richer in highly chlorinated polychloroalkanes. It is thus possible, by an appropriate choice of the bromine-yielding compound, to control somewhat the course of the polychloroalkane-chlorine interaction.

In actual practice of the invention, the process is most conveniently carried out in an externally heated tubular reactor. The polychloroalkane is vaporized separately, preheated nearly to a reaction temperature, and passed as a stream through the reactor. Chlorine is added in the desired proportion before or as the stream enters the reactor or even portionwise at intervals along the reactor. The bromine or bromine-yielding compound may be introduced as a vapor into the polychloroalkane vapor stream or may be dissolved in the liquid polychloroalkane and vaporized simultaneously therewith. Reaction times may be varied over a considerable range, though a rapid flow rate, corresponding to a contact time at reaction temperature of 0.1 to 20 seconds, is in general preferred. The vapor stream leaving the reaction zone is ordinarily condensed, after which the condensate may be subjected to treatment, e. g. fractional distillation, to separate the various reaction products.

While the process of the invention may, if desired, be carried out in the presence of inert diluents, e. g. fixed gases such as hydrogen or nitrogen, these latter are usually omitted as an unnecessary complication. Hydrocarbon vapors seem to inhibit the accelerative effect of bromine. Consequently, the polychloroalkane reactant should be purified, if necessary, to insure that the reaction mixture will be substantially hydrocarbon-free.

The following examples will further illustrate the invention but are not to be construed as limiting its scope.

Example 1

A mixture of propylene dichloride (1.2-dichloropropane) and chlorine was pyrolyzed in the presence of carbon tetrabromide as accelerator. The process was carried out in an externally heated one-inch inside diameter graphite tube 15 inches long. Liquid propylene dichloride was mixed with 1 mol per cent thereof of carbon tetrabromide, and the mixture vaporized, and passed as a stream through a preheater at about 160° C. and thence through the reactor, the average temperature of which was 392° C. with a peak temperature of 429° C. Chlorine in a ratio of 99 mol per cent of the propylene dichloride was injected into the vapor stream as it passed through the preheater. The process was carried out continuously for 3.5 hours at a flow rate corresponding to a contact time in the reactor of 0.8 second. The vapor stream leaving the reactor was passed through a water-cooled condenser, any uncondensed gas being collected and analyzed. The condensate was fractionally distilled to isolate its components.

During the run, only 0.9 per cent of the chlorine fed remained unreacted and appeared in the condenser vent gas. Of the propylene dichloride, 25.3 per cent was recovered unchanged, the balance being pyrolyzed to other chlorohydrocarbons at conversion percentages as follows (mol per cent based on propylene dichloride fed):

|  | Per cent |
|---|---|
| Monochloropropenes | 1.2 |
| Dichloropropenes | 22.0 |
| Trichloropropenes | 4.3 |
| Trichloropropanes | 19.2 |
| Tetrachloropropanes | 15.1 |
| Higher chlorohydrocarbons | 5.7 |

In a similar run, not according to the invention, which was carried out for the sake of comparison in a manner identical to that just described except that no carbon tetrabromide was used, 14.8 per cent of the chlorine escaped reaction. Of the propylene dichloride 41.1 per cent was recovered unchanged, the balance being pyrolyzed at conversion percentages as follows:

|  | Per cent |
|---|---|
| Monochloropropenes | 0.6 |
| Dichloropropenes | 6.9 |
| Trichloropropenes | nil |
| Trichloropropanes | 32.8 |
| Tetrachloropropanes | 14.9 |
| Higher chlorohydrocarbons | 3.4 |

Example 2

Using the apparatus and procedure of Example 1, 1.1.2-trichloroethane was pyrolyzed together with 14 mol per cent of chlorine in the presence of 1.0 mol per cent of carbon tetrabromide at a reaction temperature in the range 525° to 610° C., average 586° C. There was no detectable quantity of chlorine in the reactor vent gas.

When the run was repeated in the absence of carbon tetrabromide, a significant proportion of chlorine was found in the vent gas.

Example 3

Using the apparatus and procedure of Example 1, a chlorine-catalyzed pyrolysis was carried out with a crude tetrachloroethane stock containing about 45 per cent by weight of uns. tetrachloroethane, 45 per cent sym. tetrachloroethane, and 8 per cent pentachloroethane, the balance being related chlorohydrocarbons. This stock was mixed with 1.0 mol per cent of carbon tetrabromide and the mixture vaporized. The vapors, together with 10.3 mol per cent thereof of chlorine, were passed through the preheater at 417° C. and the reactor at an average temperature of 502° C., maximum 550° C. The average contact time was 1.5 seconds, and the duration of the run 4.7 hours.

In this process, only 0.9 per cent of the chlorine fed appeared unreacted in the vent gas. The tetrachloroethane feedstock was 90 per cent converted to lighter chlorohydrocarbons which consisted of 84.0 mol per cent of trichloroethylene, and 8.8 mol per cent perchloroethylene, balance related compounds.

In a comparative run identical with that just described except that the carbon tetrabromide was omitted, 11.8 per cent of the chlorine fed was found in the vent gas. The feedstock was 81.4 per cent converted to lighter products of substantially the same analysis as those obtained with carbon tetrabromide present.

What is claimed is:

1. In a process wherein a hydrocarbon-free vapor mixture of a polychloroalkane containing from two to three carbon atoms and not over four chlorine atoms per molecule and from 5 to 100 mol per cent thereof of chlorine is pyrolyzed at a temperature of 300° to 650° C., the improvement which comprises carrying out the pyrolysis in the presence of a catalytic proportion of bromine vapor.

2. In a process of preparing chlorohydrocarbons, the step which comprises passing a hydrocarbon-free stream of a mixture of a vaporized polychloroalkane containing from two to three carbon atoms and not over four chlorine atoms per molecule, 5 to 100 mol per cent thereof of chlorine, and from 0.1 to 5 mol per cent thereof of a bromoaliphatic hydrocarbon containing less than 3 carbon atoms and more than 2 bromine atoms per molecule through a heated zone maintained at a temperature of 350° to 625° C. at a rate corresponding to a contact time of 0.1 to 20 seconds.

3. In a process of preparing chlorohydrocarbons, the step which comprises passing a hydrocarbon-free stream of a mixture of a vaporized polychloroalkane containing from two to three carbon atoms and not over four chlorine atoms per molecule, 5 to 100 mol per cent thereof of chlorine, and from 0.1 to 5 mol per cent thereof of a bromoalkane containing from one to two bromine atoms and from three to five carbon atoms per molecule through a heated zone maintained at a temperature of 350° to 625° C. at a rate corresponding to a contact time of 0.1 to 20 seconds.

4. In a process of preparing chlorohydrocarbons, the step which comprises passing a hydrocarbon-free stream of a mixture of a vaporized polychloroalkane containing from two to three carbon atoms and not over four chlorine atoms per molecule, 5 to 100 mol per cent thereof of chlorine, and from 0.1 to 5 mol per cent thereof of a substance selected from the class consisting of bromine and compounds which yield bromine at an elevated temperature through a heated zone maintained at a temperature of 350° to 625° C. at a rate corresponding to a contact time of 0.1 to 20 seconds.

5. A process according to claim 2 wherein the bromine-yielding substance is carbon tetrabromide.

6. In a process of simultaneously producing dichloropropenes and polychloropropanes, the steps which comprise passing a vapor stream consisting of 1,2 dichloropropane, an approximately equimolar proportion of chlorine, and from 0.1 to 5 mol per cent thereof of a substance selected from the class consisting of bromine and compounds which yield bromine at an elevated temperature through a heated zone maintained at a temperature of 350° to 625° C. at a rate corresponding to a contact time of 0.1 to 20 seconds, condensing the vapors leaving the zone, and separating dichloropropenes and polychloropropanes from the condensate.

ELTON K. MORRIS.

REFERENCES CITED

The following references are of record in the file of this patent:

UNITED STATES PATENTS

| Number | Name | Date |
|---|---|---|
| 2,378,859 | Mugdan et al. | June 19, 1945 |
| 2,449,286 | Fairbairn | Sept. 14, 1948 |

OTHER REFERENCES

Groggins, "Unit Processes in Organic Synthesis," First Edition, pages 182-4 (1935).

Groggins, "Unit Processes in Organic Synthesis," Third Edition, McGraw-Hill Book Company, Inc., 1947, pages 217 and 234.